(No Model.)
O. HANSON,
VELOCIPEDE WHEEL.
No. 420,061.  Patented Jan. 28, 1890.
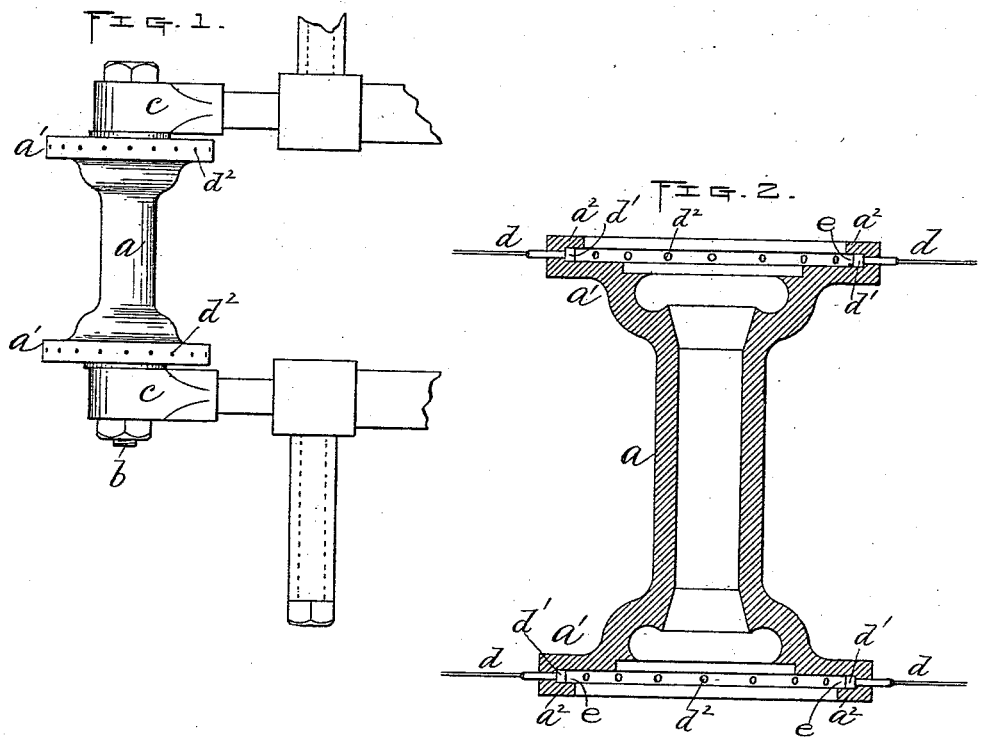
Witnesses;
W. B. Monroe
Lucius W. Briggs
Inventor;
Olaus Hanson
By A. A. Barker Att'y

UNITED STATES PATENT OFFICE.

OLAUS HANSON, OF WORCESTER MASSACHUSETTS, ASSIGNOR TO IVER JOHNSON, OF SAME PLACE.

VELOCIPEDE-WHEEL.

SPECIFICATION forming part of Letters Patent No. 420,061, dated January 28, 1890.

Application filed February 6, 1889. Serial No. 298,935. (No model.)

*To all whom it may concern:*

Be it known that I, OLAUS HANSON, of the city and county of Worcester, and State of Massachusetts, have invented certain new and useful Improvements in Velocipede-Wheel Hubs and Spokes; and I do hereby declare that the following is a full, clear, and exact description thereof, reference being had to the accompanying drawings, forming a part of this specification, and in which—

Figure 1 represents a plan of the bearing and hubs, as well as part of the front forks of the front velocipede-wheel. Fig. 2 is a central longitudinal section, upon an enlarged scale, of the front-wheel bearing and hubs, showing also the inner ends of the spokes fastened in said hubs. Figs. 3 and 4 are a side view and transverse section, respectively, of the inner end of one of my improved wheel-spokes; and Fig. 5 is a transverse section through one of the hubs, upon the same scale as Fig. 2, taken in line with the spoke-openings.

My invention relates more particularly to bicycles, but is also applicable to tricycles and similar velocipedes.

It consists in an improved manner of fastening the inner ends of the spokes to the hubs, whereby said spokes are held against rotary motion therein, as and for the purpose hereinafter more fully specified.

To enable others skilled in the art to which my invention appertains to make and use the same, I will now proceed to describe it more in detail.

In the drawings, $a$ represents the front-wheel bearing of a bicycle having the hubs $a'$ $a'$ formed thereon at each end.

$b$ is the wheel-axle, and $c$ $c$ the lower ends of the front fork, which are pivoted at each end of the bearing to said axle, as usual.

My improvement in the manner of fastening the inner ends of the spokes $d$ to the hubs is as follows: Each hub is made with a flange $a^2$, extending outward parallel to the axle, and then inward at right angles to said axle (see Fig. 2,) to form an internal annular groove $e$ to receive the spoke-heads $d'$. They are also each provided with a series of radial openings $d^2$ $d^2$, through which to pass the spokes in fitting them in position. Said heads are made with one or more flat sides, or otherwise shaped, so that when fitted in the recess or groove $e$ the spokes are held securely against rotary motion therein. They are preferably made with two opposite flat sides, as $d^3$ $d^3$, parallel to each other; but I do not limit myself thereto.

The purpose of my invention is to facilitate the operation of fitting and fastening the spokes in position. By this provision the employment of a wrench, as usual, to hold said spokes while screwing the nuts on in the fastening operation is unnecessary, the spokes being held with sufficient security against turning in the manner previously described; and, furthermore, when the spokes are once fastened they are not liable to become loose by the nuts unturning in using the machine, the rigidity of the spokes tending to prevent said unscrewing of the nuts. Consequently the spokes are always in a taut condition and the whole wheel held in a firm and secure manner.

I am aware of the United States patent to L. P. Valiquet, No. 313,460, dated March 3, 1885, which shows a transversely-slotted angular flange on each end of the hub, but which is not claimed therein. In view of said patent I limit my invention to the specific construction herein set forth and pointed out in my claim.

Having described my invention, what I claim therein as new, and desire to secure by Letters Patent, is—

The velocipede-wheel hub having an annular unbroken flange $a^2$ projecting inward at its outer end, and an annular internal groove $e$ just inside of said flange to receive the heads $d'$ of the spokes $d$, also having a series of transverse holes extending radially outward from said annular groove to receive the shanks of the spokes, in combination with said spokes having the heads thereof made flat upon one or more sides, substantially as and for the purpose set forth.

OLAUS HANSON.

Witnesses:
A. A. BARKER,
W. B. NOURSE.